(12) United States Patent
Wedkamp

(10) Patent No.: US 6,565,757 B1
(45) Date of Patent: May 20, 2003

(54) UV RADIATION DEVICE, ESPECIALLY FOR DISINFECTING LIQUIDS WITH REDUCED UV TRANSMISSION

(75) Inventor: Horst Wedkamp, Herford (DE)

(73) Assignee: Wedeco AG, Dusseldorf (DE)

( * ) Notice: Subject to any disclaimer, the term of this patent is extended or adjusted under 35 U.S.C. 154(b) by 0 days.

(21) Appl. No.: 09/806,546

(22) PCT Filed: Dec. 30, 1999

(86) PCT No.: PCT/EP99/10476

§ 371 (c)(1),
(2), (4) Date: Mar. 30, 2001

(87) PCT Pub. No.: WO00/40511

PCT Pub. Date: Jul. 13, 2000

(30) Foreign Application Priority Data

Dec. 30, 1998 (DE) .......................................... 198 60 530

(51) Int. Cl.⁷ .............................. B01J 19/12; C02F 1/32
(52) U.S. Cl. ..................... 210/748; 422/186.3; 250/436
(58) Field of Search ............................ 210/748; 422/24, 422/186.3; 250/434–436, 432 R

(56) References Cited

U.S. PATENT DOCUMENTS

| | | | |
|---|---|---|---|
| 2,212,330 A | * | 8/1940 | Thomas |
| 4,367,410 A | | 1/1983 | Wood |
| 4,482,809 A | | 11/1984 | Maarschalkerweerd |
| 4,757,205 A | | 7/1988 | Latel et al. |
| 5,019,256 A | | 5/1991 | Ifill et al. |
| 5,368,826 A | | 11/1994 | Weltz et al. |
| 5,418,370 A | | 5/1995 | Maarschalkerweerd |
| 5,660,719 A | | 8/1997 | Kurtz et al. |
| 6,126,841 A | * | 10/2000 | Whitby et al. |
| 6,303,087 B1 | * | 10/2001 | Wedekamp |

FOREIGN PATENT DOCUMENTS

| | | |
|---|---|---|
| EP | 0 080 780 A1 | 11/1982 |
| EP | 0 249 450 A2 | 10/1987 |
| EP | 0 687 201 B1 | 4/1994 |
| EP | 0 809 936 A1 | 2/1997 |

\* cited by examiner

*Primary Examiner*—Fred Prince
(74) *Attorney, Agent, or Firm*—Woodbridge & Associates, P.C.; Richard C. Woodbridge; Thomas J. Onka

(57) ABSTRACT

The invention relates to a device (10) for UV irradiation, each UV module (14) being designed as an immersible radiator and being in each case formed by a round UV radiator (26) which is designed as a mercury low-pressure radiator and is enclosed by a sleeve tube (28) which is transparent to UV rays, each UV module (14) being assigned an irradiation space (24) having a square cross section, the center of which is also the center (18) of the UV radiator (26) and which in each case extends from the center (18) half-way to the neighboring UV modules (14), the centers (18) of four neighboring UV modules (14) forming the corners of a square (20), the area of which corresponds to the sum of the cross-sectional area (F1) of a UV module (14) and the cross-sectional area (F2) of the irradiation space (24) of a UV module, and in that the spacing of the UV modules (14) from one another is selected in such a way that the cross-sectional area (F2) of the irradiation space (24) of each UV module (14) is no more than 10 times greater than the cross-sectional area (F1) of the UV module (14) itself.

13 Claims, 2 Drawing Sheets

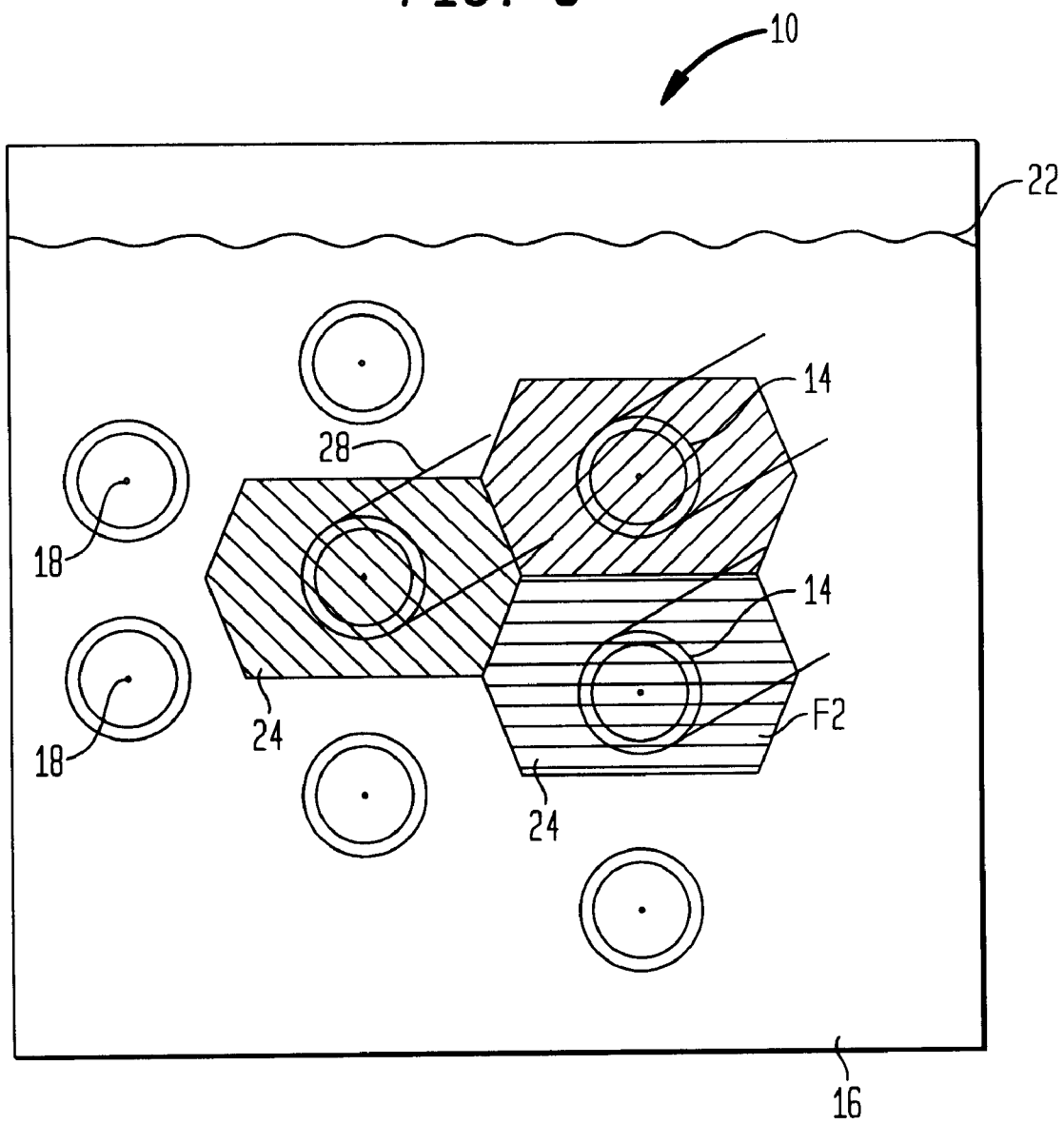

UV RADIATION DEVICE, ESPECIALLY FOR DISINFECTING LIQUIDS WITH REDUCED UV TRANSMISSION

BACKGROUND OF THE INVENTION

1. Field of the Invention

The invention relates to a device for the UV irradiation, in particular for the disinfection, of flowing liquids having reduced UV transmission. The device has one or more support frames with a plurality of UV modules, which each contain a mercury low-pressure radiator. The UV modules are held spaced apart essentially parallel by the support frames and extend along the flow direction of the flowing liquid, which is in particular purified waste water.

2. Discussion of Related Art

Devices of this type are in particular used in treatment plants, since nowadays the purified water from treatment plants must ever more frequently be disinfected before being discharged into natural waters. To that end, the waste water purified by the treatment plant is exposed to ultraviolet radiation (UV irradiation). The UV modules used in this case, which have mercury low-pressure radiators, generate UV radiation in the wavelength range of from about 200 nm to 300 nm with a maximum at 253.7 nm.

The UV modules are designed as UV immersible radiators and each comprise a mercury low-pressure radiator enclosed by a sleeve tube which is transparent to UV radiation. Corresponding UV irradiation devices of the type described so far are known, for example, from the documents EP 0687201, DE 3270676, U.S. Pat. No. 4,757,205, U.S. Pat. No. 5,019,256, U.S. Pat. No. 4,482,809, EP 0080780 and EP 0249450.

SUMMARY OF INVENTION

In contrast to clean untainted water, the waste water to be disinfected has a greatly reduced UV transmission, which is generally in the range of from 40% to 60% per 1 cm of layer thickness. This means that 40% to 60% of the applied UV radiation is absorbed by a water layer having a thickness of as little as 1 cm (for comparison: pure drinking water has a transmission in the range of from about 90% to 98%, and the absorption losses are hence only from 2% to 10% per 1 cm of layer thickness). The effect of the poor UV transmission of such media is that only relatively thin layers of the waste water around the sleeve tube can be effectively irradiated, because the efficient penetration depth of the UV radiation is so small. For layers located further away from the sleeve tube, the irradiation time needs to be long, and this necessitates a reduced flow speed. Known devices for the UV treatment of waste water can therefore only disinfect small amounts of waste water per unit time.

It is therefore an object of the present invention to permit improved UV disinfection of larger amounts of waste water having reduced UV transmission.

This is achieved in that the spacing of the UV modules from one another is selected in such a way that the cross section of the irradiation space, which is obtained for each UV module, is no more than ten times greater than the cross section of the UV module. In particular, the mercury low-pressure radiators of the UV modules should emit an irradiation strength, or intensity, of greater than or equal to 60 mW/cm$^2$ on the sleeve-tube surface of the sleeve tube in the 200–280 nm range. The cross section of the irradiation space of a UV module is preferably no more than 7.5 times greater than the cross section of the UV module itself.

The term "high-power mercury low-pressure radiator" refers to radiators which have an electrical power of more than 150 watts per meter of radiator length and/or (in the new state) a radiation power of more than 50 W per meter of radiator length in the UV-C range. The term "irradiation space", which is obtained for each UV module, will be explained in more detail below.

BRIEF DESCRIPTION OF THE DRAWINGS

An exemplary embodiment of the present invention will be described below with reference to the drawing, in which:

FIG. 3 shows an alternative embodiment of the present UV device invention in which the irradiation space is a hexagon.

FIG. 1 shows a schematic perspective representation of a UV device 10 having frames 12 which support UV modules 14. Each UV module 14 comprises a high-power mercury low-pressure radiator 26, which is enclosed by a sleeve tube 28 in a manner which is known per se.

Figure 1:
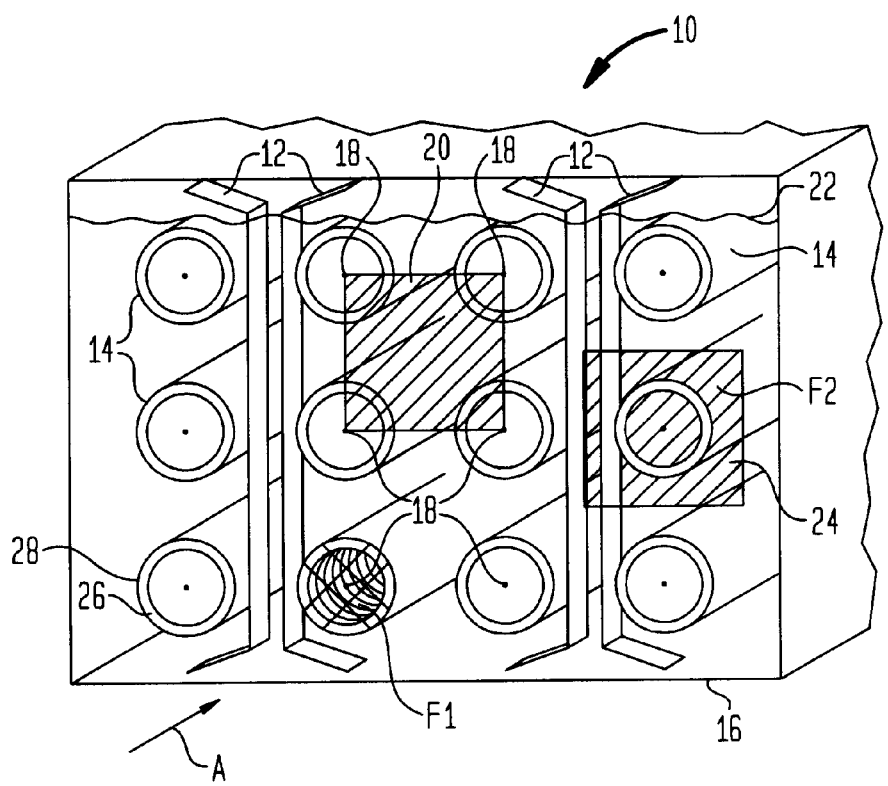
FIG. 1 shows a UV device according to the invention in a schematic perspective representation.

The device 10 is arranged in a trough (not shown in detail), in which the waste water flows along the direction of the arrow A and which has a trough bottom 16. The UV modules 14, which extend horizontally, are arranged in such a way that their centers 18 form the corners of an imaginary square 20. In the drawing, all the UV modules 14 are in the waste water below the water surface 22.

Each UV module 14 is assigned an irradiation space 24, which is formed by an imaginary space around a UV module 14, in which the UV module 14 is located as the center. The irradiation space 24 is of square design in cross section and in each case extends from a UV module 14 half-way to the neighbouring UV modules, and corresponds in terms of its cross-sectional area to the cross section of the imaginary square 20.

In the invention, the spacing of the UV modules 14 is selected in such a way that the cross-sectional area F2 of the irradiation space of each UV module 14 is no more than 10 times—in particular no more than 7.5 times—greater than the cross-sectional area F1 of the UV module 14 in question. The relationship F2 less than or equal to 10×F1 (or preferably F2 less than or equal to 7.5×F1) is therefore satisfied.

The high-power mercury low-pressure radiators 26 with their high radiation power apply a high irradiation strength of a greater than or equal to 60 mW/cm$^2$ on the sleeve-tube surface. In this case, sleeve tubes 28 having a comparatively large external diameter of at least 3.0 cm are employed. Despite the relatively large surface area of the sleeve tube, an increased power is nevertheless achieved on the surface per cm$^2$ because of the aforementioned high-power mercury low-pressure radiators.

In tests, it has surprisingly been found that with the invention a substantially higher flow speed of the waste water is possible, namely more than 0.25 m/s, and significantly larger amounts of waste water can be disinfected per unit time so that the efficiency of the device according to the invention is improved many times. In an expedient refinement of the invention, the UV radiators 26 have an external diameter of about 22 mm to 32 mm, the annular gap between the UV radiators and the surrounding sleeve tube being at least 3 mm and preferably from 4 to 6 mm.

In another expedient refinement of the invention, amalgam-doped high-power mercury low-pressure radiators are used in order to achieve a high radiation power. In an expedient refinement of the invention, in order to achieve high radiation powers these low-pressure radiators are operated at high efficiencies using electronic ballast devices as are known, for example, from the document DE 196 37 906 A1. In this case, up to two low-pressure radiators can be operated using a shared electronic ballast device.

Figure 2:
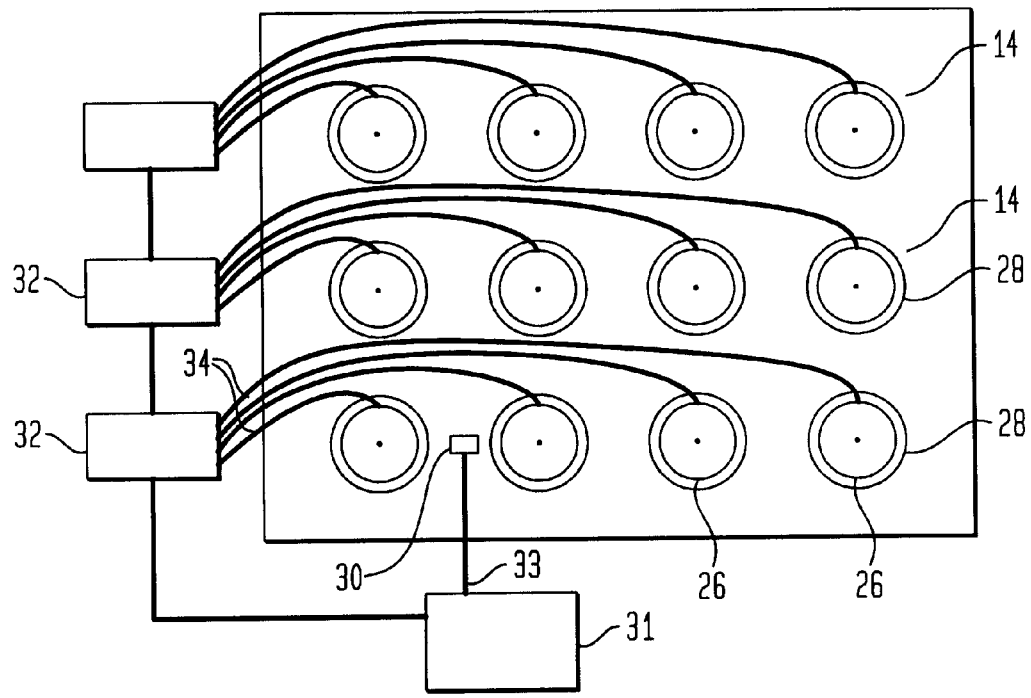
FIG. 2 shows an electrical circuit for controlling the UV radiators.

In connection with this, FIG. 2 shows a schematic representation of an arrangement of radiator modules 14 corresponding to FIG. 1 having a radiation sensor 30, a control system 31 and electronic ballast devices 32 which are intended to drive the UV radiators 26. The radiation sensor 30 measures, in mW/cm$^2$, the radiation intensity incident at a defined distance from the sleeve tube 28, and transmits the measurement to the control system 31 via an electrical line 33. The measurement is compared there with the intended radiation intensity, which is required for effective operation of the plant. The electrical power delivered by the electronic ballast devices 32 to the radiators 26 via electrical lines 34 is then controlled in such a way that essentially no more and no less than this optimum value of the radiation intensity is achieved.

In this case, a further advantage obtained is controllability of the radiators, which allows a radiation power less than the maximum possible radiation power to be set according to the transmission of the medium.

The effect of the ageing process of Hg low-pressure radiators during operation is furthermore that the radiation power mentioned at the start, namely for example 50 W of UV-C per meter of radiator length, decreases even though the power consumption remains approximately the same. The controllability of the UV radiators therefore makes it possible, for the first time, to have a configuration which is designed for reliable operation with ample efficiency at the end of the scheduled service life, that is to say sufficient disinfection is guaranteed e.g. with 20 W of UV-C per meter of discharge length. This radiation power can then be set at the start of the working period using the regulating process. To that end, the delivered electrical power is reduced from e.g. 200 W to 100 W per metre of radiator length. With increased ageing, the radiation power can then be kept constant by increasing the delivered electrical power. This regulating process may be carried out by means of UV sensors 30, which measure the radiation power actually being output and match it to requirements by means of a regulating circuit.

Using the present configuration of radiators and sleeve tubes, such a regulating process is possible for the first time since, being more than 3.0 mm, the annular gap between the radiator and the sleeve tube is dimensioned in such a way that even when the power consumption has decreased in comparison with the maximum power, the radiator is not cooled to below its minimum required operating temperature.

What is claimed is:

1. A device (10) for the UV irradiation, in particular for the disinfection of flowing liquids in the form of purified waste water, the device (10) being arranged in an irradiation chamber and comprising at least one support frame (12) having a plurality of UV modules (14) which are arranged parallel to one another along the flow direction (A) of the purified waste water, and each UV module (14) being designed as an immersible radiator and being in each case formed by a UV radiator (26) which is designed as a mercury low-pressure radiator and is enclosed by a sleeve tube (28) which is transparent to UV rays, each UV module (14) having an annular gap between said UV radiator and said sleeve tube, said UV radiators being connected to an electrical power source through an electronic control system, said device being characterized in that each UV module (14) is assigned an irradiation space (24) having a polygonal cross section, the center of which is also the center (18) of the UV radiator (26) and which in each case extends from the center (18) half-way to the neighboring UV modules (14) being arranged in such a way that the centers (18) of a number of neighboring UV modules (14) form the vertices of a polygon (20), the area of which corresponds to the sum of the cross-sectional area (F1) of a UV module (14) and the cross-sectional area (F2) of the irradiation space (24) of a UV module (14), and in that the spacing of the UV modules (14) from one another is selected in such a way that the cross-sectional area (F2) of the irradiation space (24) of each UV module (14) is no more than 10 times greater than the cross-sectional area (F1) of the UV module (14).

2. The device according to claim 1 characterized in that the cross-sectional area (F2) of the irradiation space (24) of each UV module (14) is not more that 7.5 times greater than the cross-sectional area (F1) of the UV module (14) assigned to the irradiation space (24).

3. The device according to claim 1 characterized in that the UV modules (14) in each case contain a high-power UV radiator (26) which has a discharge length of at least 1.2 m and generates a radiation power of more than 50 watts of UV-C per 1 m of discharge length.

4. The device according to claim 1 characterized in that the flow velocity of the purified waste water flowing through the irradiation spaces (24) is more than 0.25 m per second.

5. The device according to claim 1 characterized in that, at low waste water flow rates, laminar flow with parallel streamlines takes place through the irradiation space (24).

6. The device according to claim 1 characterized in that the UV radiator (26) of a UV module (14) has an external diameter of between 22 mm and 32 mm.

7. The device according to claim 1 characterized in that the internal diameter of the sleeve tubes (28) of the UV modules (14) is dimensioned in such a way that an annular gap of more than 3 mm is formed between the UV radiator (26) and the sleeve tube (28).

8. The device according to claim 1 wherein said electronic control system for said UV radiators (26) is a controllable electronic ballast device, by means of which the electrical power source of the UV radiators (26) can be controlled.

9. The device according to claim 8 characterized in that at least two UV radiators (26) are operated using a shared electronic ballast device.

10. The device according to claim 8 characterized in that the internal diameter of the sleeve tubes (28), in the case when the UV radiators (26) are operated using electronic ballast devices, is dimensioned in such a way that the annular gap between the UV radiator (26) and the sleeve tube (28) is greater than 3.0 mm.

11. The device according to claim 1 characterized in that the irradiation space is designed as a quadrilateral or as a hexagon.

12. The device according to claim 1 characterized in that the electrical power source of the UV radiators (26) is controlled in such a way that a radiation power which is constant as a function of time is generated in the UV range.

13. The device according to claim 1 characterized in that the electrical power source of the UV radiators (26) is controlled as a function of the UV transmission of the liquid.

* * * * *